(12) United States Patent
Nishigaki et al.

(10) Patent No.: US 9,630,128 B2
(45) Date of Patent: Apr. 25, 2017

(54) OIL SEPARATOR

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Atsushi Nishigaki, Anjo (JP); Naoki Kira, Nagoya (JP); Jun Ikeda, Nagoya (JP); Shin Satsumabayashi, Toyota (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 158 days.

(21) Appl. No.: 14/412,088

(22) PCT Filed: Jun. 28, 2013

(86) PCT No.: PCT/JP2013/067838
§ 371 (c)(1),
(2) Date: Dec. 30, 2014

(87) PCT Pub. No.: WO2014/007164
PCT Pub. Date: Jan. 9, 2014

(65) Prior Publication Data
US 2015/0182891 A1    Jul. 2, 2015

(30) Foreign Application Priority Data

Jul. 4, 2012 (JP) .................................. 2012-150721
Nov. 22, 2012 (JP) .................................. 2012-256710

(51) Int. Cl.
*B01D 45/12* (2006.01)
*B01D 35/00* (2006.01)
(Continued)

(52) U.S. Cl.
CPC ........... *B01D 35/005* (2013.01); *B01D 45/12* (2013.01); *B01D 45/16* (2013.01); *B04C 5/04* (2013.01);
(Continued)

(58) Field of Classification Search
CPC ........ B01D 45/12; B01D 45/16; F01M 13/04; F01M 13/0416; F01M 13/0462;
(Continued)

(56) References Cited

U.S. PATENT DOCUMENTS 2,337,684 A * 12/1943 Scheineman ............ B01J 8/005
                                              159/4.07
4,891,129 A    1/1990 Barnes
(Continued)

FOREIGN PATENT DOCUMENTS

EP    1 163 738 A1    3/2010
JP    62-102849 A     5/1987
(Continued)

OTHER PUBLICATIONS

International Search Report (PCT/ISA/210) mailed on Aug. 6, 2013, by the Japanese Patent Office as the International Searching Authority for International Application No. PCT/JP2013/067838.
(Continued)

*Primary Examiner* — Dung H Bui
(74) *Attorney, Agent, or Firm* — Buchanan Ingersoll & Rooney PC

(57) ABSTRACT

Provided is an oil separator that operates in an efficient manner as a whole for collection of oil mist in blowby gas as multiple oil separator units collect the oil mist equally regardless of various particle sizes thereof. The oil separator includes a distribution chamber distributing blowby gas, an introducing hole introducing the blowby gas into the distribution chamber, at least one set of oil separator units
(Continued)

disposed in symmetry relative to at least one plane having an axis extending through an axis of the introducing hole of axes of flowing directions of the blowby gas entering the distribution chamber through the introducing hole, and distribution channels causing the blowby gas to flow from the distribution chamber to the respective oil separator units.

8 Claims, 5 Drawing Sheets

(51) Int. Cl.
B01D 45/16 (2006.01)
B04C 5/04 (2006.01)
B04C 5/28 (2006.01)
F01M 13/04 (2006.01)
F01M 13/00 (2006.01)

(52) U.S. Cl.
CPC .............. B04C 5/28 (2013.01); F01M 13/04 (2013.01); F01M 13/0405 (2013.01); F01M 13/0416 (2013.01); F01M 2013/0066 (2013.01); F01M 2013/0422 (2013.01); F01M 2013/0427 (2013.01)

(58) Field of Classification Search
CPC .... F01M 2013/0066; F01M 2013/0427; B04C 5/04; B04C 5/28
See application file for complete search history.

(56) References Cited

U.S. PATENT DOCUMENTS

| | | | |
|---|---|---|---|
| 6,279,556 B1 | 8/2001 | Busen et al. | |
| 2002/0189452 A1* | 12/2002 | Benham | B01D 45/12 95/269 |
| 2004/0088956 A1 | 5/2004 | Gammack | |
| 2004/0237484 A1 | 12/2004 | Altvater et al. | |
| 2005/0115406 A1 | 6/2005 | Ahlborn et al. | |
| 2006/0112941 A1 | 6/2006 | Hilpert et al. | |
| 2009/0229585 A1 | 9/2009 | Tanaka et al. | |

FOREIGN PATENT DOCUMENTS

| | | |
|---|---|---|
| JP | 2002-540338 A | 11/2002 |
| JP | 2003-528704 A | 9/2003 |
| JP | 2006-022700 A | 1/2006 |
| JP | 2006-505732 A | 2/2006 |
| JP | 2006-516219 A | 6/2006 |
| JP | 2009-013941 A | 1/2009 |
| JP | 2009-221857 A | 10/2009 |
| JP | 2009-250193 A | 10/2009 |
| JP | 4544638 B2 | 9/2010 |
| JP | 4861529 B1 | 1/2012 |
| JP | 2012036802 A * | 2/2012 |

OTHER PUBLICATIONS

Written Opinion (PCT/ISA/237) mailed on Aug. 6, 2013, by the Japanese Patent Office as the International Searching Authority for International Application No. PCT/JP2013/067838.
Japanese Office Action issued on Aug. 7, 2014 in Japanese Application No. 2012-150721 with English language translation of relevant portion (6 pages).
Japanese Office Action issued on Jul. 25, 2014 in Japanese Application No. 2012-256710 with English language translation of relevant portion (4 pages).
Notification of Transmittal of Translation of the International Preliminary Report on Patentability (Forms PCT/IB/338 and PCT/IB/373) and the Written Opinion of the International Searching Authority (Form PCT/ISA/237) issued on Jan. 15, 2015, by the International Bureau of WIPO in corresponding International Application No. PCT/JP2013/067838. (8 pages).
U.S. Appl. No. 14/412,063, filed Dec. 30, 2014, Kira et al.
U.S. Appl. No. 14/440,446, filed May 4, 2015, Kira et al.

* cited by examiner

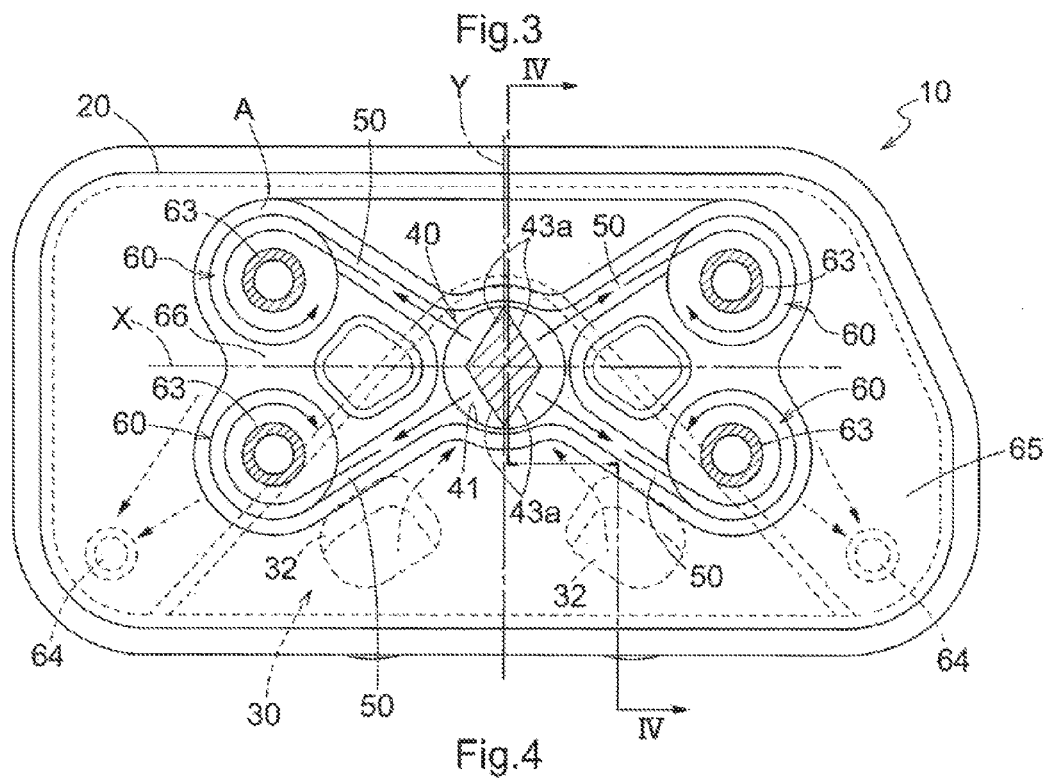
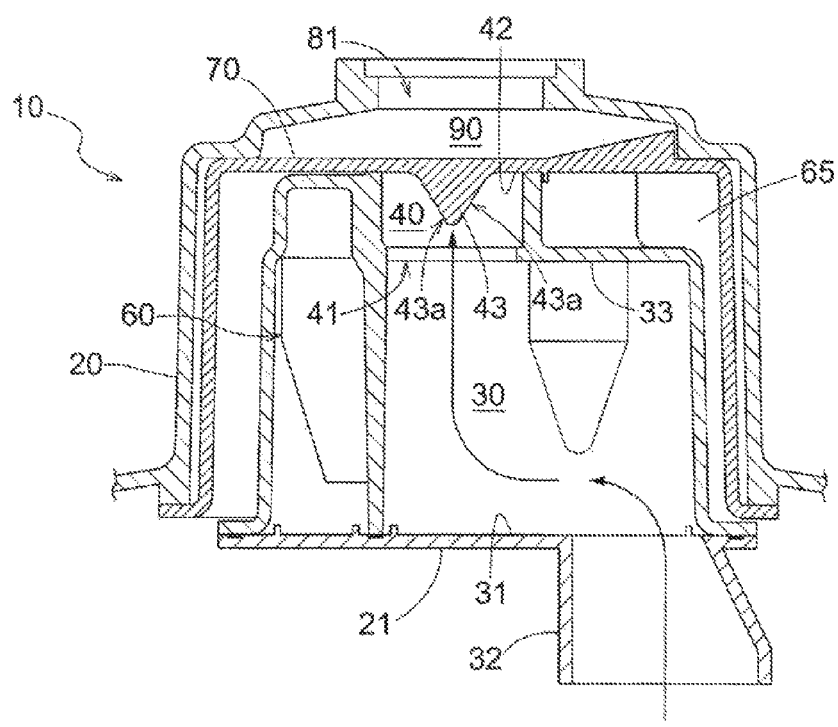

OIL SEPARATOR

TECHNICAL FIELD

The present invention relates to an oil separator configured to separate oil mist from blowby gas.

BACKGROUND ART

An engine obtains power by rotating a crankshaft with combustion of mixture gas in a combustion chamber. However, not all of an amount of mixture gas introduced to the combustion chamber is combusted. A portion of the mixture gas leaks into a crankcase via a gap present between a piston and a cylinder. This leaked gas is called blowby gas. It is legally prohibited, in particular in Japan, to discharge blowby gas, which is un-combusted gas, directly into the atmosphere as emission gas. For this reason, blowby gas is returned to an intake port via a PVC (Positive Crankcase Ventilation) channel to be mixed with newly introduced mixture gas for subsequent combustion together and eventual emission into the atmosphere.

Blowby gas contains therein a certain amount of lubricant oil such as engine oil in the form of oil mist. If blowby gas containing oil mist is returned to the intake port, the oil will adhere to the PCV channel and/or periphery of the intake port undesirably. Then, for the purpose of collecting oil mist present in blowby gas, an oil separator is provided inside a cylinder head cover or in midway of the PCV channel.

Patent Document 1 discloses an oil separator using a plurality of cyclones. With this oil separator, blowby gas entering via a gas introducing opening is introduced through a rectifying chamber to the multiple cyclones which are disposed side by side in series. Due to a centrifugal force by a swirling stream generated inside the cyclone, oil mist present in the blowby gas is flocculated and collected.

PRIOR-ART DOCUMENT

Patent Document

Patent Document 1: Japanese Unexamined Patent Application Publication No. 2009-221857

SUMMARY

Problem to be Solved by Invention

Blowby gas contains oil mist of various particle sizes. In the case of the oil separator disclosed in Patent Document 1, the blowby gas introducing opening is disposed at an end portion, so distances from this gas introducing opening to the respective cyclones disposed side by side in series differ from each other. Further, oil mist having large particles sizes tend to be present mostly in the vicinity of the gas introducing opening, and the particle sizes of the oil mist become smaller and smaller away from the gas introducing opening. This is because oil mist having large particle sizes have large masses. Therefore, a cyclone disposed near the gas introducing opening will collect much of the oil mist having large particle sizes, and the particle sizes of the oil mist collected by the cyclones become smaller and smaller as the cyclones are located away from the gas introducing opening. Due to the particle size difference of the oil mist collected by the respective cyclones, oil-mist collection efficiencies of the respective cyclones also differ from each other, so that efficient oil mist collection by the oil separator as a whole is not possible.

In view of the above-described problem, an object of the present invention is to provide an oil separator capable of efficient operation as a whole, regardless of particle size differences of respective multiple oil separator units (cyclones), through uniform collection of oil mist contained in blowby gas by effective separation of the oil mist.

Solution

For accomplishing the above-noted object, according to a characterizing feature of the invention, an oil separator comprises:

a distribution chamber distributing blowby gas;

an introducing hole introducing the blowby gas into the distribution chamber;

at least one set of oil separator units disposed in symmetry relative to at least one plane having an axis extending through an axis of the introducing hole of axes of flowing directions of the blowby gas entering the distribution chamber through the introducing hole; and distribution channels causing the blowby gas to flow from the distribution chamber to the respective oil separator units.

With the above-described characterizing feature, thanks to the symmetric layouts of the distribution channels and the oil separator units, it is possible to cause blowby gas containing oil mist of all of various particles sizes to enter the oil separator units, whereby the amount of blowby gas introduced in a unit time period can be made equal for all of the oil separator units. Consequently, all the oil separator units can provide a substantially equal oil mist collection efficiency, and the oil separator as a whole can operate in an efficient manner for oil mist collection.

In the oil separator having the above-described configuration, preferably, at least one of a channel cross section area or a channel length of the distribution channel is same for all the respective distribution channels.

With the above-described arrangement, the amounts of blowby gas introduced to the oil separator units in a unit time period can be made equal, so that all the oil separator units can achieve substantially same level of oil mist collection efficiency. As a result, the oil separator as a whole can operate in an efficient manner for oil mist collection.

In the oil separator having the above-described configuration, preferably, at least one of a flow rate and a velocity of the blowby gas flowing in the each distribution channel is same.

With the above-described arrangement too, the amounts of blowby gas introduced to the oil separator units in a unit time period can be made equal, so that all the oil separator units can achieve substantially same level of oil mist collection efficiency. As a result, the oil separator as a whole can operate in an efficient manner for oil mist collection.

In the oil separator having the above-described configuration, preferably, the oil separator further comprises a gas discharging hole discharging blowby gas exiting the oil separator units to the outside; and the gas discharging hole and the gas introducing hole are disposed on a same axis.

With the above-described arrangement, channel lengths from the respective oil separator units to the gas discharging hole are same also. Accordingly, blowby gas can be discharged equally from the respective oil separator units. Thus, all the oil separator units can achieve substantially same level of oil mist collection efficiency. As a result, the oil separator as a whole can operate in an efficient manner not only for oil mist collection, but also for blowby gas discharging.

In the oil separator having the above-described configuration, preferably, a wall face of the distribution chamber present in the flowing direction of blowby gas introduced through the introducing hole to the distribution chamber includes a guide configured to guide the blowby gas to the respective distribution channel.

With the above-described arrangement, the blowby gas introduced to the distribution chamber can be guided by the guide to the respective distribution channels equally. Thus, all the oil separator units can achieve substantially same level of oil mist collection efficiency. As a result, the oil separator as a whole can operate in an efficient manner for oil mist collection.

In the oil separator having the above-described configuration, preferably, the oil separator further comprises a first lid portion surrounding and covering therein the oil separator units, the distribution chamber, the introducing hole and the distribution channels, and a second lid portion surrounding and covering therein the first lid portion, the first lid portion and the second lid portion together forming at least a portion of a lateral face portion as a double-layered structure.

With the above-described arrangement, even when there exists a temperature difference between the inner side of the first lid portion and the outer side of the second lid portion, it is possible to alleviate the influence of the temperatures to each other. For this reason, for instance, in case an extremely low temperature exits on the outer side of the second lid portion, thus freezing the inside of the first lid portion, it is possible to restrict drop in the temperature of the blowby gas supplied to the inside of the first lid portion due to the temperature prevailing on the outer side of the second lid portion, so that the inside of the first lid portion can be heated smoothly by the blowby gas. Accordingly, even when the oil separator units, the distribution chamber, the introducing hole and the distribution channels are frozen, speedy thawing is possible with the blowby gas, thus allowing the oil separator to operation speedily to its appropriate state. Thus, all the oil separator units can achieve substantially same level of oil mist collection efficiency. As a result, the oil separator as a whole can operate in an efficient manner for oil mist collection.

In the oil separator having the above-described configuration, preferably, the portion formed as the double-layered structure comprises a sealed space.

With the above-described arrangement, it is made possible to further improve the heat insulation between the first lid portion and the second lid portion. Accordingly, even when the respective portions of this space are frozen, it is possible to bring the oil separator into its appropriate operation speedily. As a result, the oil separator as a whole can operate in an efficient manner for oil mist collection.

In the oil separator having the above-described configuration, preferably, a space into which the oil from the oil separator units is discharged is formed on the inner side of the double-layered structure.

With the above-described arrangement, it is possible also to enhance the heat insulation of the space into which the oil is discharged from the oil separator units. Accordingly, even when this space is frozen, it is possible to bring the oil separator into its appropriate operation speedily. As a result, the oil separator as a whole can operate in an efficient manner for oil mist collection.

In the oil separator having the above-described configuration, preferably, a closed space is formed between the portion formed as the double-layered structure and the space into which the oil is discharged from the oil separator units.

With the above-described arrangement, it is possible also to enhance the heat insulation of the space into which the oil is discharged from the oil separator units. Accordingly, even when this space is frozen, it is possible to bring the oil separator into its appropriate operation speedily. Thus, all the oil separator units can achieve substantially same level of gas discharging efficiency. As a result, the oil separator as a whole can operate in an efficient manner not only for oil mist collection, but also for discharging of the blowby gas.

For accomplishing the above-noted object, according to a further characterizing feature of the present invention, an oil separator comprises:

at least one set of cyclone type oil separator units effecting gas-liquid separation of blowby gas;

a distribution chamber distributing blowby gas to be introduced to the oil separator units;

an introducing hole introducing the blowby gas into the distribution chamber;

distribution channels causing the blowby gas to flow from the distribution chamber to the respective oil separator units;

a first lid portion surrounding and covering therein the oil separator units, the distribution chamber, the introducing hole and the distribution channels, and a second lid portion surrounding and covering therein the first lid portion;

the first lid portion and the second lid portion together forming at least a portion of a lateral face portion as a double-layered structure.

With the above-described arrangement, even when there exists a temperature difference between the inner side of the first lid portion and the outer side of the second lid portion, it is possible to alleviate the influence of the temperatures to each other. For this reason, for instance, in case an extremely low temperature exits on the outer side of the second lid portion, thus freezing the inside of the first lid portion, it is possible to restrict drop in the temperature of the blowby gas supplied to the inside of the first lid portion due to the temperature prevailing on the outer side of the second lid portion, so that the inside of the first lid portion can be heated smoothly by the blowby gas. Accordingly, even when the respective portions, i.e. the oil separator units, the distribution chamber, the introducing hole and the distribution channels are frozen, speedy thawing is possible with the blowby gas, thus allowing the oil separator to operation speedily to its appropriate state. Thus, all the oil separator units can achieve substantially same level of oil mist collection efficiency. As a result, the oil separator as a whole can operate in an efficient manner for oil mist collection.

In the oil separator having the above-described configuration, preferably, the portion formed as the double-layered structure comprises a sealed space.

With the above-described arrangement, it is made possible to further improve the heat insulation between the first lid portion and the second lid portion. Accordingly, even when the respective portions, i.e. the oil separator units, the distribution chamber, the introducing hole and the distribution channels are frozen, it is possible to put the oil separator to operation speedily to its appropriate state. As a result, the oil separator as a whole can operate in an efficient manner for oil mist collection.

In the oil separator having the above-described configuration, preferably, a space into which the oil is discharged from the oil separator units is formed on the inner side of the double-layered structure.

With the above-described arrangement too, it is possible also to enhance the heat insulation of the space into which the oil is discharged from the oil separator units. Accordingly, even when this space is frozen, it is possible to bring the oil separator into its appropriate operation speedily. As a result, the oil separator as a whole can operate in an efficient manner for oil mist collection.

In the oil separator having the above-described configuration, preferably, a closed space is formed between the portion formed as the double-layered structure and the space into which the oil is discharged from the oil separator units.

With the above-described arrangement, it is possible also to enhance the heat insulation of the space into which the oil is discharged from the oil separator units. Accordingly, even when this space is frozen, it is possible to bring the oil separator into its appropriate operation speedily. As a result, all the oil separator units can achieve substantially same level of gas discharging efficiency, and the oil separator as a whole can operate in an efficient manner not only for oil mist collection, but also for discharging of the blowby gas.

BRIEF DESCRIPTION OF THE DRAWINGS

FIG. 3 is a section taken along a line III-III in FIG. 2, FIG. 4 is a section taken along a line IV-IV in FIG. 3.

EMBODIMENTS

1. First Embodiment

[Configuration of Oil Separator]

Figure 1:
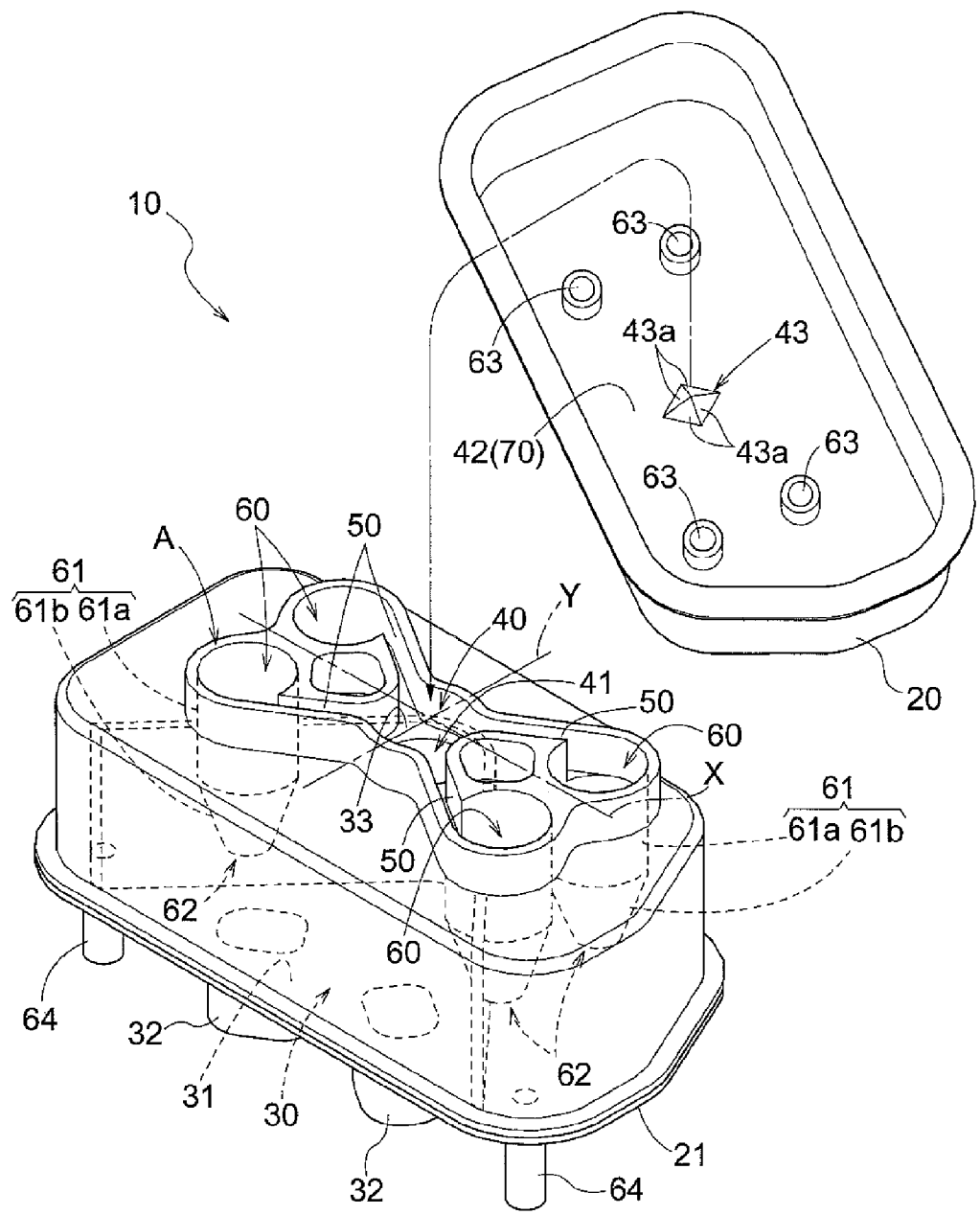
FIG. 1 is an exploded perspective view showing an outer appearance of an oil separator according to a first embodiment.
Figure 2:
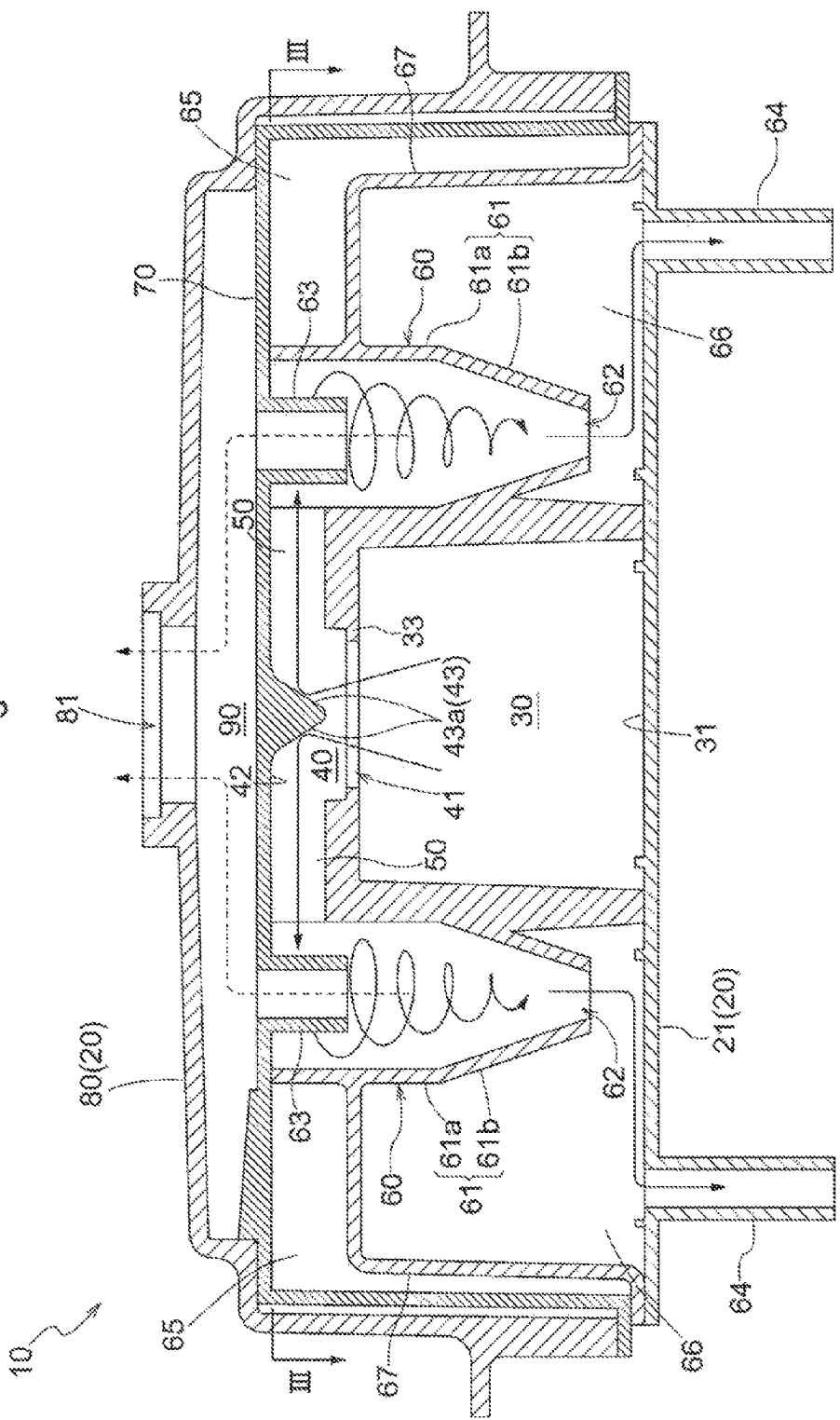
FIG. 2 is a vertical section showing a configuration of the oil separator.

Next, an embodiment of the present invention will be described in details. FIG. 1 shows an exploded perspective view showing an outer appearance of an oil separator 10 according to this embodiment. FIG. 2 shows a vertical section showing a configuration of the oil separator 10. FIG. 3 shows a section taken along a line III-III in FIG. 2. Fi. 4 shows a section taken along a line IV-IV in FIG. 3. The oil separator 10 is mounted inside a head cover (not shown) of an engine of a vehicle. This oil separator 10 is formed of a resin.

As shown in FIG. 1 and FIG. 2, the oil separator 10 includes a housing 20 constituting an outer appearance of the separator, a first reservoir chamber 30 formed inside the housing 20, gas introducing pipes 32, 32, a distribution chamber 40, distribution channels 50, 50, 50, 50, oil separator units 60, 60, 60, 60, an oil discharging pipe 64, a second reservoir chamber 90 and an gas discharging hole 81.

The first reservoir chamber 30 is a space partitioned by a partitioning plate and having a shape of a triangular prism. A portion of a bottom plate 21 constituting the housing 20 forms a bottom face 31 of the first reservoir chamber 30. As shown in FIG. 4, the bottom face 31 integrally forms the two gas introducing pipes 32, 32. Each gas introducing pipe 32 has a hole defined in the bottom face 31 and a tubular wall having a tubular bore continuous with the above hole and projecting toward the outside of the separator 10 from the bottom plate 21. The gas introducing pipe 32 is connected to an unillustrated gas introducing channel.

An upper face 33 of the first reservoir chamber 30 defines a circular introducing hole 41. Inside the housing 20 and on the side opposite the first reservoir chamber 30 relative to the introducing hole 41, there is formed a distribution chamber 40 which is a cylindrical space. The first reservoir chamber 30 and the distribution chamber 40 are communicated to each other via the introducing hole 41. The inside diameter of the distribution chamber 40 is same as the inside diameter of the introducing hole 41 and the capacity of the distribution chamber 40 is much smaller than the capacity of the first reservoir chamber 30. In the lateral face of the distribution chamber 40, the distribution channels 50, 50, 50, 50 are formed to extend straight toward the radially outer side and in parallel with the bottom face 31. The distribution chamber 40 and the distribution channels 50 are communicated to each other. The four distribution channels 50, 50, 50, 50 have a same channel cross section area in a direction perpendicular to flowing directions of blowby gas and have a same channel length also.

As shown in FIG. 2, on top of the distribution chamber 40, the distribution channels 50, 50, 50, 50 and the oil separator units 60, 60, 60, 60 to be described later, a first lid plate 70 is attached. The first lid plate 70 is gaplessly connected by bonding, welding, etc. to an upper edge A of the distribution chamber 40, the distribution channels 50, 50, 50, 50, and the oil separator units 60, 60, 60, 60 shown in FIG. 1. With this, the flowing blowby gas will not leak to the outside of the distribution chamber 40 and the distribution channels 50, and will flow into the oil separator units 60 in a reliable manner. An upper face 42 (a portion of the first lid plate 70) of the distribution chamber 40 includes a guide 43 projecting from the upper face 42 toward the distribution chamber 40. This guide 43 has a shape of a quadrangular pyramid having a bottom face which comes into contact with the upper face 42. As shown in FIG. 3, four lateral faces 43a, 43a, 43a, 43a of the guide 43 are formed to extend perpendicular to the flowing directions of blowby gas inside the four respective distribution channels 50, 50, 50, 50.

To respective ends of the distribution channels 50, 50, 50, 50 opposite the distribution chamber 40, the oil separator units 60, 60, 60, 60 are connected, with each oil separator unit 60 being connected to the distribution channel 50 corresponding thereto. The each oil separator unit 60 includes a main body portion 61, an oil discharging portion 62 and a gas discharging portion 63. The four oil separator units 60, 60, 60, 60 all have a same size, with respective axes thereof being parallel with each other and also perpendicular to the flowing directions of the blowby gas in the respective distribution channels 50. Further, as shown in FIG. 3, the distribution channels 50, 50, 50, 50 and the oil separator units 60, 60, 60, 60 are disposed in line-symmetry relative to a plane X and a plane Y which are perpendicular to each other and extend through the axis of the introducing hole 41 (distribution chamber 40).

The main body portion 61 has a cylinder portion 61a having a cylindrical shape and a cone portion 61b coaxial with the cylinder portion 61a and continuous from the lower end of the cylinder portion 61a and progressively reduced in its diameter downwards. Each distribution channel 50 and each oil separator unit 60 corresponding thereto are disposed such that the distribution channel 50 extends along a tangential direction of the inner circumferential face of the cylinder portion 61a. At the lower end of the cone portion 61b, an opening is formed as the oil discharging portion 62. Incidentally, as shown in FIG. 3, the two oil separator units 60, 60 opposed to each other relative to the plane X are disposed near each other whereas the oil separator units 60, 60 opposed to each other relative to the plane Y are disposed away from each other. With this arrangement, it is possible to reduce the thickness of the oil separator 10 in the direction perpendicular to the plane X.

At corner portions of the bottom plate 21, the oil discharging pipes 64, 64 are formed at two positions for discharging oil mist to the outside of the oil separator 10. As shown by broken-line arrows in FIG. 3, in the bottom plate 21, a gentle downward slope extending from the position intersecting the axes of the two oil separator units 60, 60 toward the oil discharging pipe 64 provided at one position is formed for the respective oil discharging pipe 64.

The gas discharging portion 63 is formed integral in the first lid plate 70, and includes a hole formed in the first lid plate 70 and a cylindrical wall having a cylindrical bore continuous with the above hole and projecting from the first lid plate 70 toward the oil separator unit 60. The lower end of the gas discharging portion 63 is present inside the cylinder portion 61a and the axis of the gas discharging portion 63 constitutes the same axis of the cylinder portion 61a. The upper end of the gas discharging portion 63 is opened to the outside of the first lid plate 70. The four gas discharging portions 63 all are of a same size.

As shown in FIG. 2, upwardly of the first lid plate 70 and spaced apart therefrom, a second lid plate 80 forming a part of the housing 20 is disposed. The first lid plate 70 and the second lid plate 80 together form the second reservoir chamber 90. The second lid plate 80 defines a gas discharging hole 81 for discharging blowby gas reserved in the second reservoir chamber 90 to the outside of the oil separator 10. The blowby gas reserved in the second reservoir chamber 90 is blowby gas from which oil mist has been separated by the oil separator unit 60. Therefore, this blowby gas will be referred to simply as "gas" hereinafter. The axis of the gas discharging hole 81 is same as the axis of the distribution chamber 40. To this gas discharging hole 81, an unillustrated gas discharging channel is connected.

[Operations of Oil Separator]

The other end of the gas discharging channel is connected to an intake port. Blowby gas is sucked by a negative pressure generated by air flowing through the intake port to flow the inside of the oil separator 10. As shown in FIG. 4, blowby gas drawn out of the crankcase and flown through the gas introducing channel flows into the first reservoir chamber 30 via the gas introducing pipe 32. The introduced blowby gas is reserved temporarily inside the first reservoir chamber 30. As shown in FIG. 2 and FIG. 3, the blowby gas introduced from the first reservoir chamber 30 into the distribution chamber 40 collides the lateral faces 43a of the guide 43, thus being distributed equally in the four directions to flow into the distribution channels 50, 50, 50, 50.

The blowby gas flown past the distribution channels 50, 50, 50, 50 will flow into the oil separator units 60, 60, 60, 60 and then flow along the inner circumferential faces of the cylinder portions 61a, 61a, 61a, 61a. Inside the each oil separator unit 60, the blowby gas will swirl along the inner circumferential face of the cylinder portion 61a, thus forming a swirling stream falling toward the cone portion 61b. By this swirling stream, a centrifugal force is generated in the blowby gas, whereby oil mist contained in the blowby gas will be caused to collide the inner circumferential face of the cylinder portion 61a or the cone portion 61b and will adhere thereto. With this, the oil mist is separated and collected from the blowby gas. Meanwhile, as shown in FIG. 3, the swirling directions of the swirling streams inside the respective oil separator units 60 are also symmetric relative to the plane X and the plane Y.

The oil mist adhered to the inner circumferential face of the cylinder portion 61a or the cone portion 61b will flocculate while flowing down along the wall face of the cone portion 61b and then will drop onto the bottom plate 21 through the oil discharging portion 62. As shown by the broken-line arrows in FIG. 3 and FIG. 2, the dropped oil mist will flow down along the slope of the bottom plate 21 and pass the inner channel of the oil discharge discharging pipe 64 and eventually be discharged to the outside of the oil separator 10 and returned to the unillustrated oil pan.

As shown by the broken-line arrows in FIG. 2, the gas will flow through the gas discharging portion 63 and flow into the second reservoir chamber 90. Thereafter, the gas will be discharged through the gas discharging hole 81 and flow through the gas discharge channel and be returned to the intake port.

[Function/Effect of First Embodiment]

The oil separator 10 is configured such that the distribution channels 50, 50, 50, 50 and the oil separator units 60, 60, 60, 60 are arranged radially around the center constituted by the distribution chamber 40 for distributing blowby gas and also that the gas discharging hole 81 is disposed coaxial with the distribution chamber 40. Moreover, as described above, the four distribution channels 50, 50, 50, 50 all have a same channel cross section area as determined perpendicularly to the blowby gas flowing direction as well as a same channel length. Further, the four oil separator units 60, 60, 60, 60 including the gas discharge portions 63 are of a same size. Therefore, the blowby gas with containing oil mist of all particle sizes therein will flow into the four oil separator units 60, 60, 60, 60 respectively in a uniform manner. Thus, the each oil separator unit 60 can collect equally oil mist present in the blowby gas, regardless of the sizes of the oil mist. As a result, the four oil separator units 60, 60, 60, 60 can achieve substantially equal oil mist collecting efficiency, so that the oil separator 10 as a whole can be operated in an efficient manner for oil mist collection.

Further, in this oil separator 10, the gas discharging hole 81 and the distribution chamber 40 are disposed coaxially, so that the channel lengths from the respective gas discharging portions 63 via the second reservoir chamber 90 to the gas discharging hole 81 are also equal. Accordingly, the gas can be discharged equally from the respective oil separator units 60. Consequently, the four oil separator units 60, 60, 60, 60 can achieve substantially equal gas discharging efficiency, so that the oil separator 10 as a whole can operate in an efficient manner for gas discharging also.

In the instant embodiment, the four distribution channels 50, 50, 50, 50 all have a same channel cross section area as determined perpendicularly to the blowby gas flowing direction as well as a same channel length. However, the configuration is not limited thereto. Either only one of the channel cross sections and the channel lengths can be made same.

Even in the case wherein both the channel cross section areas and the channel lengths of the distribution channels 50 are different, an arrangement can still be made for setting the channel cross section areas and the channel lengths such that the amounts per unit period time of blowby gas flowing into the four oil separator units 60, 60, 60, 60 are rendered equal to each other. Specifically, the channel cross section area of a distribution channel 50 having a longer channel length should be set larger, whereas the channel cross section area of a distribution channel 50 having a shorter channel length should be set smaller. Alternatively, the channel cross section areas and the channel lengths of the distribution channels 50 can be set such that the flowing velocities of blowby gas flowing through the four distribution channels 50, 50, 50, 50 may be equal to each other.

In the instant embodiment, the distribution channels 50, 50, 50, 50 and the oil separator units 60, 60, 60, 60 are disposed symmetric relative to the plane X and the plane Y. However, the configuration is not limited thereto. The distribution channels 50, 50, 50, 50 and the oil separator units 60, 60, 60, 60 may be disposed symmetric relative to only one of the plane X and the plane Y.

2. Variation of First Embodiment

Figure 5:
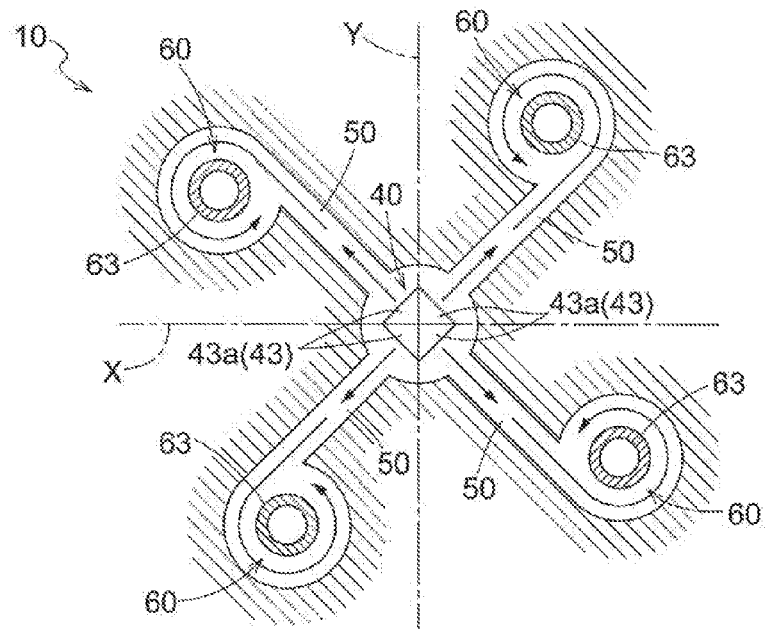
FIG. 5 is a horizontal section showing layouts of distribution channels and oil separator units of an oil separator according to a variation of the first embodiment.

FIG. 5 shows a horizontal section showing layouts of distribution channels 50 and oil separator units 60 of an oil separator 10 according to a variation of the first embodiment. In the following discussion of the embodiment mode and variation, portions identical to those in the first embodiment will be denoted with the same marks/numerals as the first embodiment and explanations thereof will be omitted. In this variation, four distribution channels 50, 50, 50, 50 are disposed with 90 degrees angular spacing from each other; and also the distribution channels 50 and the oil separator units 60 are arranged such that the swirling direction of swirling streams of blowby gas inside all the oil separator units 60, 60, 60, 60 may be same. The rest of the configuration is identical to the first embodiment.

With the above-described layouts of the distribution channels 50 and the oil separator units 60, it is possible to minimize the mounting area of the oil separator 10 as seen in the direction along the axial direction of the guide 43 and also to allow the four oil separator units 60, 60, 60, 60 to achieve substantially equal oil mist collection efficiency. As a result, in the respect of both oil mist collection and gas discharging, the oil separator 10 as a whole can be operated in an efficient manner.

3. Second Embodiment

Figure 6:
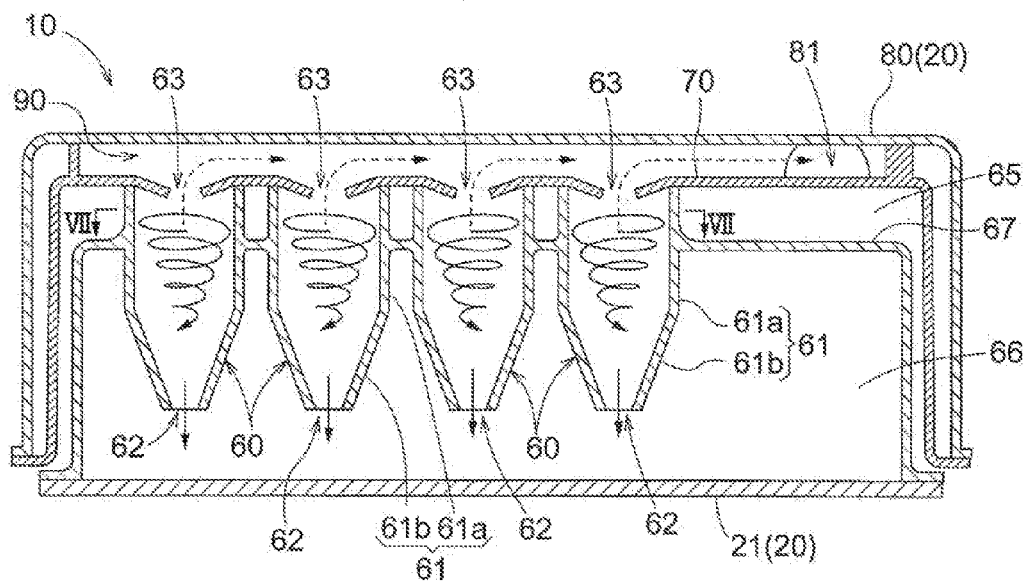
FIG. 6 is a vertical section showing a general configuration of an oil separator according to a second embodiment.
Figure 7:
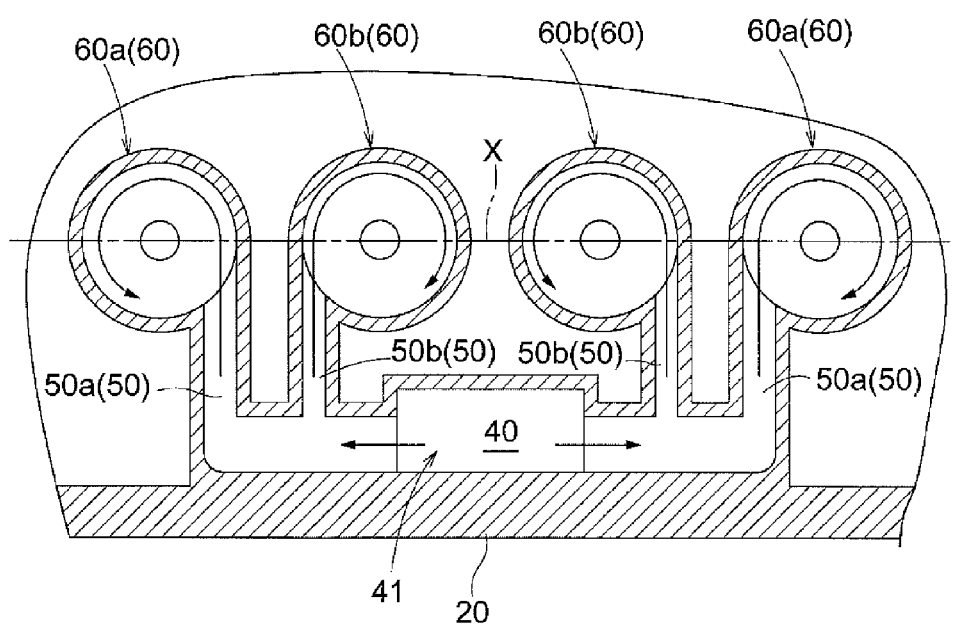
FIG. 7 is a section taken along a line VII-VII in FIG. 6.

FIG. 6 shows a vertical section showing a general configuration of an oil separator 10 according to a second embodiment. FIG. 7 shows a section taken along a line VII-VII in FIG. 6. In this embodiment, the introducing hole 41 is formed at an end of the housing 20 and also the axes of the four oil separator units 60, 60, 60, 60 are arranged inline on the plane X. In these respects, this embodiment differs from the first embodiment. Another difference from the first embodiment is that the gas discharging hole 81 is provided at an end of the oil separator 10. With the inline layout of the four oil separator units 60, 60, 60, 60 so that the four axes thereof may be on the plane X, it becomes possible to further reduce the thickness of the oil separator 10 in the direction perpendicular to the plane X, in comparison with the first embodiment.

In the instant embodiment, outer distribution channels 50*a*, 50*a* extending from the introducing hole 41 to two outer oil separator units 60*a*, 60*a* disposed on the outer side have a channel cross section area perpendicular to the flowing direction and a channel length which are greater respectively than a channel cross section area perpendicular to the flowing direction and a channel length of inner distribution channels 50*b*, 50*b* extending to two inner oil separator units 60*b*, 60*b* disposed on the inner side. With this arrangement, it is possible to equate the amount of blowby gas per unit period flowing in the two outer oil separator units 60*a*, 60*a* with the amount of blowby gas per unit period flowing in the two inner oil separator units 60*b*, 60*b*. As a result, the four oil separator units 60, 60, 60, 60 can provide substantially equal oil mist collection efficiency and the oil separator 10 as a whole can be operated in an efficient manner.

Incidentally, the oil separator 10 relating to the present invention can be described as follows.

The oil separator 10 includes at least one set of cyclone type oil separator units 60 effecting gas-liquid separation of blowby gas, a distribution chamber 40 distributing blowby gas to be introduced to the oil separator units 60, an introducing hole 41 introducing the blowby gas into the distribution chamber 40, distribution channels 50 causing the blowby gas to flow from the distribution chamber 40 to the respective oil separator units 60, a first lid plate 70 (corresponding to "a first lid portion" in the invention) surrounding and covering therein the oil separator units 60, the distribution chamber 40, the introducing hole 41 and the distribution channels 50, and a second lid plate 80 (corresponding to "a second lid portion" in the invention) surrounding and covering therein the first lid portion 70. The first lid plate 70 and the second lid plate 80 together form at least a portion of a lateral face portion as a double-layered structure.

With the above arrangement, even when there exists a temperature difference between the inner side of the first lid plate 70 and the outer side of the second lid plate 80, it is possible to reduce the influence of temperatures to each other. For this reason, in case an extremely low temperature exits on the outer side of the second lid plate 80, thus freezing the inside of the first lid plate 70, it is possible to restrict drop in the temperature of the blowby gas supplied to the inside of the first lid plate 70 due to the temperature prevailing on the outer side of the second lid plate 80, so that the inside of the first lid plate 70 can be heated smoothly by the blowby gas. Accordingly, even when the oil separator units 60, the distribution chamber 40, the introducing hole 41 and the distribution channels 50 are frozen, speedy thawing is possible with the blowby gas, thus allowing the oil separator 10 to operation speedily to its appropriate state. Thus, all the oil separator units 60 can achieve substantially equal level of oil mist collection efficiency. As a result, the oil separator 10 as a whole can operate in an efficient manner for oil mist collection.

In the oil separator 10 having the above-described configuration, the portion formed as the double-layered structure can comprise a sealed space.

With the above-described arrangement, it is made possible to further improve the heat insulation between the first lid plate 70 and the second lid plate 80. Accordingly, even when the oil separator units 60, the distribution chamber 40, the introducing hole 41 and the distribution channels 50 are frozen, it is possible to put the oil separator 10 to operation speedily to its appropriate state. As a result, the oil separator 10 as a whole can operate in an efficient manner for oil mist collection.

In the oil separator 10 having the above-described configuration, a space 66 into which the oil is discharged from the oil separator units 60 can be formed on the inner side of the double-layered structure.

With the above-described arrangement, it is possible also to enhance the heat insulation of the space 66 into which the oil is discharged from the oil separator units 60. Accordingly, even when this space 66 is frozen, it is possible to bring the oil separator 10 into its appropriate operation speedily. As a result, the oil separator 10 as a whole can operate in an efficient manner for oil mist collection.

In the oil separator 10 having the above-described configuration, preferably, a closed space 65 can be formed between the portion formed as the double-layered structure and the space 66 into which the oil is discharged from the oil separator units 60 and can be separated from the space 66 into which the oil is discharged from the oil separator units 60 by extending portions 67 extending between the cylinder portions 61a of the oil separation units 60 and the first lid portion 70.

With the above-described arrangement, it is possible also to enhance the heat insulation of the space 66 into which the oil is discharged from the oil separator units 60. Accordingly, even when this space 66 is frozen, it is possible to bring the oil separator 10 into its appropriate operation speedily. Thus, all the oil separator units 60 can achieve substantially equal level of gas discharge efficiency. As a result, the oil separator 10 as a whole can operate in an efficient manner not only for oil mist collection, but also for discharging of the blowby gas.

INDUSTRIAL APPLICABILITY

The present invention is applicable to an oil separator configured to separate oil mist from blowby gas.

DESCRIPTION OF REFERENCE MARKS/NUMERALS 10 oil separator
40 distribution chamber
41 introducing hole
43 guide
50 distribution channel
60 oil separator unit
70 first lid plate (first lid portion)
80 second lid plate (second lid portion)
81 gas discharging hole
X plane
Y plane

The invention claimed is:

1. An oil separator comprising:
a distribution chamber distributing blowby gas;
an introducing hole introducing the blowby gas into the distribution chamber;
at least one set of cyclone oil separator units disposed in symmetry relative to at least one plane having an axis extending through an axis of the introducing hole of axes of flowing directions of the blowby gas entering the distribution chamber through the introducing hole;
distribution channels causing the blowby gas to flow from the distribution chamber to the respective oil separator units;
a first lid portion surrounding and covering therein the oil separator units, the distribution chamber, the introducing hole and the distribution channels; and
a second lid portion surrounding and covering therein the first lid portion;
the first lid portion and the second lid portion together forming at least a portion of a lateral face portion as a double-layered structure;
wherein a space into which the oil from the oil separator units is discharged is formed on the inner side of the double-layered structure; and
wherein a closed space is formed between the first lid portion and an extending portion extending from cylindrical portions of the at least one set of oil separator units.

2. The oil separator according to claim 1, wherein at least one of a channel cross section area or a channel length of the distribution channel is same for all the respective distribution channels.

3. The oil separator according to claim 1, wherein at least one of a flow rate and a velocity of the blowby gas flowing in the each distribution channel is same.

4. The oil separator according to claim 1, wherein:
the oil separator further comprises a gas discharging hole discharging blowby gas exiting the oil separator units to the outside; and
the gas discharging hole and the gas introducing hole are disposed on a same axis.

5. The oil separator according to claim 1, wherein a wall face of the distribution chamber present in the flowing direction of blowby gas introduced through the introducing hole to the distribution chamber includes a guide configured to guide the blowby gas to the respective distribution channel.

6. The oil separator according to claim 1, wherein the portion formed as the double-layered structure comprises a sealed space.

7. An oil separator comprising
at least one set of cyclone oil separator units effecting gas-liquid separation of blowby gas;
a distribution chamber distributing blowby gas to be introduced to the oil separator units;
an introducing hole introducing the blowby gas into the distribution chamber;
distribution channels causing the blowby gas to flow from the distribution chamber to the respective oil separator units;
a first lid portion surrounding and covering therein the oil separator units, the distribution chamber, the introducing hole and the distribution channels, and
a second lid portion surrounding and covering therein the first lid portion;
the first lid portion and the second lid portion together forming at least a portion of a lateral face portion as a double-layered structure;
wherein a space into which the oil from the oil separator units is discharged is formed on the inner side of the double-layered structure; and
wherein a closed space is formed between the first lid portion and an extending portion extending from cylindrical portions of the at least one set of oil separator units.

8. The oil separator according to claim 7, wherein the portion formed as the double-layered structure comprises a sealed space.

* * * * *